Figure 1:
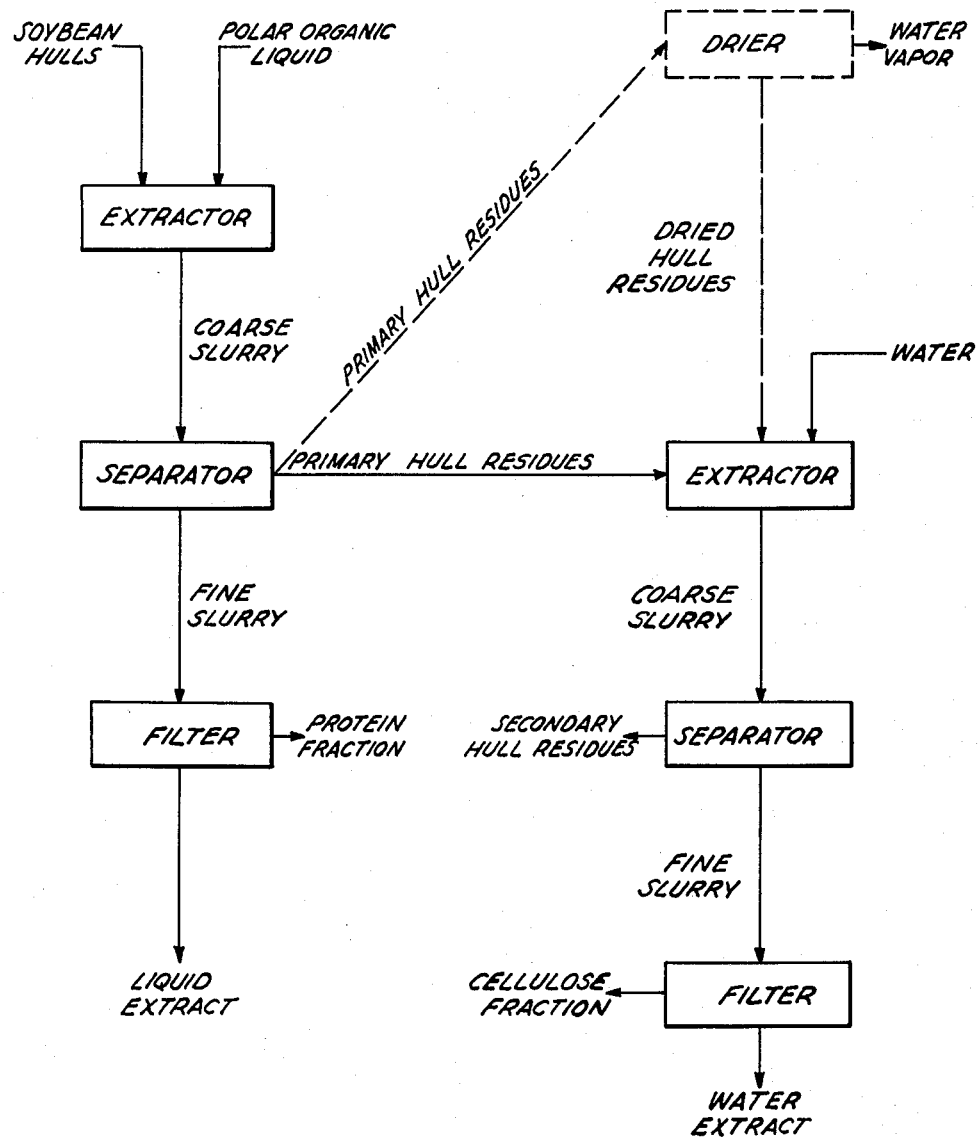

3,119,805
FRACTIONATION OF SOYBEAN HULLS
John W. Krueger, Cottage Grove, and Fred A. Andrews, Shorewood Hills, Wis., assignors to A. E. Staley Manufacturing Company, Decatur, Ill., a corporation of Delaware
Filed Apr. 13, 1960, Ser. No. 21,970
4 Claims. (Cl. 260—123.5)

This invention relates to a physical method of separating soybean hulls into several different fractions, and to the novel compositions thus obtained.

We have discovered that unexpected and useful results are obtained by soaking or steeping soybean hulls in a polar, water-miscible organic liquid such as methanol for example. The soaking, coupled with gentle agitation of the steep mixture, dislodges a minor, protein-rich fraction of the hull as a finely divided solid material. This material may be easily separated from the liquid and the coarser hull residues by sieving or by decantation.

The soaking of the hulls in the polar organic liquid accomplishes another useful result. It partially loosens the structural units of a major hull fraction from one another and from other components of the hull, so that subsequent soaking of the hull residue in water completes the loosening. Gentle agitation of the hull-water mixture, either during the soaking period or afterward, disengages the structural units from the hull residue and from one another. This second fraction, consisting mainly of small particles of alpha cellulose, becomes suspended in the water. It may be recovered by sieving off the relatively coarse hull residues and filtering or centrifuging the water suspension of the finely-divided second fraction.

In the appended claims the first hull residue, i.e., the residue remaining after separation of the protein-rich fraction, is referred to as the primary hull residue, and the second hull residue, i.e., the residue remaining after separation of the cellulose-rich fraction, is referred to as the secondary hull residue.

The two fractions or components of soybean hulls are potentially valuable new materials. The protein-rich fraction, amounting to about 3% by weight of the original hulls on a dry substance basis, contains about 45–50% protein by weight. About half of this fraction, by weight, is soluble in twenty parts by weight of water at 25° C., and the water soluble portion is about 70% protein by weight. The water soluble portion of the protein-rich fraction is an excellent foaming and whipping agent, and it contains about 2% by weight of lysine, a basic amino acid essential in human nutrition. As mentioned above, protein is calculated as Kjeldahl nitrogen multiplied by 6.25.

The cellulose-rich fraction amounts to about 35% by weight of the original dry hulls. The unitary structures of this fraction are visible under a 60 power microscope. They are rod-shaped, slightly larger at one end than the other, and rather uniform in size and shape. They are small enough to pass through a 325 mesh sieve. The rods consist chiefly of alpha cellulose encased with a thin coating of silica. The following evidence supports this view. A sample of the rods suspended in water buffered at 4.7 pH was mixed with activated papain and held at 60° C. for 24 hours. The residual solid material, after being recovered by filtration and washed on the filter, was then treated with a hot aqueous solution of sodium chlorite and acetic acid under a blanket of nitrogen by the procedure of R. L. Whistler et al., Archives of Biochemistry, volume 19, page 25. This treatment dissolves the lignin. They were then extracted with an aqueous 17.5% potassium hydroxide solution at 25° C. for 22 hours under a blanket of nitrogen to remove silica. The washed and dried residue amounted to 72% of the original dry sample. This treatment applied to vegetable material leaves a residue consisting mostly of alpha cellulose. Small portions of the rods before and after the foregoing potassium hydroxide extraction purification, were heated on a microscope slide in a muffle furnace at 550° C. and then examined under a microscope. Rod outlines were clearly visible on the slide which carried the unextracted rods, but the other slide was clear. The ash was identified as chiefly silica by its solubility in aqueous sodium hydroxide solution and by a qualitative chemical test for silica.

The cellulose-rich fraction of soybean hulls obtained in accordance with this invention is potentially useful as a cheap and convenient source of alpha cellulose. Owing to the silica sheath around the individual particles or rods, the unpurified fraction also has special utility as a cleaning and scouring powder.

The hull residue remaining after separation of the cellulose-rich fraction consists chiefly of a mixture of cellulose, hemicellulose, and lignin. It amounts to about 40% by weight of the original hulls on a dry substance basis.

Evaporation of the organic liquid extract, after the extract has been separated from the protein-rich fraction, yields a waxy complex mixture of fats, waxes, steroids, and carbohydrates. The solvent-free extract amounts to about 5% by weight of the original hulls dry substance.

Evaporation of the water extract, after the extract has been separated from the cellulose-rich fraction, yields a solid residue consisting chiefly of a mixture of proteins and carbohydrates. The dried residue amounts to about 15% by weight of the original hull dry substance.

Our invention fractionates soybean hulls into the following approximate weight proportions of materials (dry substance basis):

| | Percent |
|---|---|
| (1) Protein-rich fraction | 3 |
| (2) Polar liquid extract | 5 |
| (3) Water extract | 15 |
| (4) Cellulose-rich fraction | 35 |
| (5) Hull residue (lignin and celluloses) | 40 |

Reference is made to FIGURE 1, a schematic flow sheet of our process, for a better understanding of our invention. As shown in the figure, the process can be carried out with only three different types of conventional equipment, namely, extractor, separator and filter. The extractor may be a simple vessel for containing liquids. It may be open or closed, and preferably it should be equipped with means for gentle agitation of the vessel contents. The separator, for separating the relatively coarse hull residues from the liquid suspensions of relatively fine protein-rich and cellulose-rich fractions, may be a sieve or a decantation device. If a sieve is used, it should be one in which the screen element is replaceable, thus permitting the size of the sieve openings to be changed as desired. Preferably the sieve is adapted for agitation or vibration. The filter, for collecting the finely divided protein-rich and cellulose-rich fractions from their liquid suspensions, may be of any convenient type. It may be replaced with a solid bowl centrifuge or a filtering centrifuge.

Attention is called to the optional drying step shown by the dotted lines in FIGURE 1. The primary hull residues may be dried, if desired, and then soaked or steeped with water to obtain the cellulose-rich fraction.

Among the polar, water-miscible organic liquids useful in the process of our invention are methanol, ethanol, propanol-1, propanol-2, acetic acid, ethylene glycol, acetone, and methyl ethyl ketone. Methanol is particularly satisfactory because of its low cost, ease of recovery, and stability. Mixtures of such liquids can be used successfully, and they may contain minor proportions of non-polar organic liquids.

The weight ratio of polar organic liquid to hulls may be varied over a wide range, provided enough liquid is used to cover or surround all the hulls. Owing to the bulky nature of unground soybean hulls, usually not less than about 3 to 4 parts by weight of liquid per one part by weight of hulls can be used. High ratios of liquid to hulls have the advantage over low ratios of providing higher yields of protein-rich fraction in a single operation. This is due to the fact that at high ratios a lower proportion of the liquid, and hence a lower proportion of suspended protein-rich fraction, remains with the hull residues when they are separated from the liquid and the fine protein-rich fraction suspended therein.

The duration and temperature of the organic liquid extraction may also be varied over wide ranges. Temperature is not critical. The time required to loosen substantially all of the protein-rich fraction is reduced by raising the temperature. Temperatures from 0° C. to the boiling point of the organic liquid may be used if desired, and extraction times ranging from one hour to several days are operative. A closed extractor is needed at the higher temperatures to prevent excessive loss of liquid by evaporation. We have found that temperatures in the range of 20°–40° are suitable.

The weight ratio of water to hull residue (dry weight) in the water-soaking step of our process, as well as the duration and temperature of the step, may be varied over rather wide ranges without yielding an inoperable process. Preferably, the weight ratio of water to dry substance hull residue is in the range of 20:1 to 50:1. Lower and higher ratios can be used to produce the cellulose-rich fraction, but the yield of fraction per pass or run drops off rapidly as the ratio falls below 20:1, and the higher ratios do not result in proportionately higher yields of the fraction.

The temperature of the water-soaking step may vary from near the freezing point of water to its boiling point at atmospheric pressure. The preferred range is 20°–40° C. Temperatures higher than the boiling point at atmospheric pressure may be used if desired, but pressure resisting vessels will be required.

Duration of the water-soaking step required for maximum loosening of the cellulose fraction varies indirectly with temperature. A two hour period is adequate at room temperature of about 25° C. At higher temperatures, the time may be reduced, and at lower temperatures it must be increased to obtain the maximum yield of cellulose-rich fraction. It is to be understood, however, that the essential functioning of the water-soaking step, namely, loosening of the cellulose-rich fraction units from one another and from other structures in the hull, occurs to some degree over very wide ranges of time, temperature, and weight ratio of water to hull dry substance.

Since our process is based on separating relatively fine hull fractions from relatively coarse hull residues or fragments, it is necessary that the starting hulls be not too finely divided. We have found that the process operates satisfactorily on hull fragments larger than those passing through a No. 60 sieve, but that substantial contamination of the protein-rich and cellulose-rich fractions occurs when the original hull particles are smaller.

The soybean hulls should be clean, i.e., free of foreign material including soybean flour and, as discussed above, even finely divided soybean hulls. Any finely divided foreign materials in the hulls entering the process dilute and contaminate the protein-rich fraction.

The following examples illustrate our invention.

*Example 1*

Five pounds of clean dry soybean hulls are stirred gently with six gallons of 95% ethanol at 30° C. for eight hours. The mixture is then poured onto a vibrating 60 mesh sieve to separate the relatively coarse hull residues from the ethanol and the suspended finely divided protein-rich fraction. The wet hull residues retained on the sieve are removed from the sieve, stirred a few minutes with 2 gallons of fresh ethanol, and again poured onto the sieve. The combined liquids passing through the sieve are filtered through paper on a Büchner funnel to recover the protein-rich fraction as a wet filter cake. The filter cake, after being spread out and dried to constant weight at room temperature, amounts to 0.2 pound. It contains 47% protein, dry substance basis, and yields a strongly foaming solution with 20 parts by weight of cold water, which solution contains about 50% by weight of the dry material and about 69% by weight of the original protein. Evaporation of the combined ethanol filtrates yields 0.2 pound of waxy residue. The undried wet hull residues on the sieve are transferred to 15 gallons of water at room temperature and stirred gently with the water for 3 hours. The thin slurry of hull residues, finely divided cellulose-rich component and water is then poured slowly onto the vibrating 60 mesh sieve. The liquid passing through the sieve is filtered through paper on a Büchner funnel to recover the cellulose-rich fraction in the form of minute rods. The hull residues retained on the sieve are collected, slurried with 10 gallons of fresh water and re-sieved. The water passing through the sieve contains an additional amount of suspended rods. Evaporation of the combined water extracts gives 0.7 pound of dry residue. The total yield of rods, i.e., finely divided cellulose-rich fraction, after drying at room temperature to constant weight amounts to 1.7 pounds. The air-dry weight of final hull residues is 2.2 pounds.

*Example 2*

295 grams of clean dry soybean hulls are stirred gently with 2000 ml. of methanol at 30° C. for 2 hours. The mixture is then poured onto a vibrating 60 mesh sieve; the wet hull residue retained on the sieve is stirred 15 minutes with 2000 mls. of fresh methanol, and re-sieved. The combined liquid portions passing through the sieve are filtered through paper on a Büchner funnel to recover the protein-rich fraction. Evaporation of the filtrate yields 12 grams of waxy residue. Air drying of the filter cake to constant weight yields 7.6 grams of grey powder. The powder, analyzing for 48% protein, dissolved partially in cold water yielding a foamy solution. The undried hull residue is transferred to 8000 ml. of water at 30° C. and stirred gently therein for 3 hours. The thin slurry of hull residues, finely divided cellulose-rich fraction and water is poured slowly onto a vibrating 60 mesh sieve. The liquid passing through the sieve is filtered through paper on a Büchner funnel to recover the cellulose-rich fraction. The hull residues retained on the sieve are collected, slurried with 5000 ml. of fresh water, and resieved. The water passing through the sieve contains an additional amount of suspended rods. The total yield of cellulose-rich fraction, after being dried to constant weight at room temperature, amounts to 103 grams. Evaporation of the combined water extracts yields 45 grams of dry residue. The air-dry weight of final hull residues is 125 grams.

*Example 3*

Example 2 is repeated, except for replacing the methanol with the same volume of glacial acetic acid. Approximately the same amounts of protein-rich and cellulose-rich fractions are obtained as in Example 2. The protein-rich fraction contains 45% protein by weight. About half of the material dissolves in 20 parts by weight of cold water, and the water extract contains about 70% of the original protein. The water extract has good foaming qualities.

*Example 4*

Example 2 is repeated, except for replacing the methanol with an equal volume of acetone. Substantially the same amounts of protein-rich and cellulose-rich fractions are obtained as in Example 2. The protein-rich fraction contains 47% protein by weight. When stirred with several parts by weight of cold water, it dissolves partially and foams readily.

Example 5

Example 2 is repeated, except for drying the methanol extracted hull residues before steeping them in water. The results are substantially the same as obtained in Example 2.

Example 6

This example illustrates the use of decantation instead of sieving to separate the hull residues from the relatively finely divided protein-rich and cellulose-rich fractions suspended in the liquid media.

295 grams of clean dry soybean hulls are stirred gently with 2000 ml. of methanol at 30° C. for 2 hours in a 3000 ml. glass beaker. The mixture is then allowed to stand quietly for 5–10 minutes, in which time the relatively coarse hull fragments settle to the bottom of the beaker, leaving most of the relatively fine protein-rich fraction suspended in the methanol. The suspension is carefully siphoned from the settled hull residues with a flexible tube, and filtered through paper on a Büchner funnel to separate methanol from suspended material. The methanol filtrate is returned with stirring to the hull residues in the beaker. The mixture is again allowed to stand quietly as before, and the decantation and filtration are repeated. The cycle is repeated a third time to obtain a good separation of hull residues from protein-rich fraction. The rather thick slurry of hull residues and methanol remaining the beaker is then filtered to free the hull residues from methanol as much as possible. Evaporation of the combined methanol filtrates yields 13 grams of waxy residue. Air drying of the protein-rich fraction filter cakes gives 8 grams of fine grey powder which contains 47% protein by weight (dry substance basis) and which dissolves partially and foams readily when stirred with 20 parts by weight of cold water. The wet filter cake of hull residues is transferred to 8000 ml. of water at 30° C. in a 12,000 ml. flask and stirred gently with the water for 3 hours. The mixture is then allowed to stand quietly for 30 minutes, in which time the relatively coarse hull residues settle to the bottom of the flask, leaving most of the relatively fine cellulose-rich fraction suspended in the water. The suspension is carefully siphoned from the settled hull residues with a flexible tube and filtered through paper on a Büchner funnel to separate suspended material from water. The filtrate is returned to the flask and mixed thoroughly with the hull residues. The mixture is allowed to stand quietly as before, then the supernatant suspension is siphoned off and filtered. The cycle of mixing, settling, siphoning and filtering is repeated a third time. The final thick slurry of hull residues remaining in the flask is filtered to remove as much water as possible, and the filter cake is dried to constant weight at room temperature. Weight of dry hull residue is 124 grams. The filter cakes of cellulose-rich fraction are spread out and allowed to dry to constant weight at room temperature. The yield is 105 grams.

The sieve numbers referred to herein are those of the standard screen scale.

It is to be understood that in the first step of our process, the steeping of the soybean hulls in a polar water-miscible organic liquid, a mixture of such liquids may be used and the organic liquid (or liquids) may be diluted with an appreciable proportion of water or non-polar miscible organic liquid. We have found that useful results are obtained even though the foregoing dilution may be as high as 25% by volume.

We claim:

1. The method of fractionating soybean hulls of particle size exceeding that passing a No. 60 sieve comprising steeping a composition consisting essentially of clean soybean hulls in a polar water-miscible organic liquid selected from the group consisting of methanol, ethanol, propanol-1, propanol-2, acetic acid, ethylene glycol, acetone and methyl ethyl ketone at a temperature lying within the range of 0° C. to the boiling point of the liquid, whereby a finely divided protein-rich fraction of said hulls is loosened from the hull structure, agitating the steep mixture of hulls and organic liquid to obtain a mixed suspension consisting essentially of said protein-rich fraction and relatively coarse primary hull residues in the organic liquid medium, filtering the relatively coarse hull residues from the suspension of said protein-rich fraction in the organic liquid, steeping the separated primary hull residues in water at temperatures of 5°–100° C., whereby a finely divided cellulose-rich fraction of said hulls is loosened from the hull structure, agitating the steep mixture of primary hull residues and water to obtain a mixed suspension consisting essentially of said cellulose-rich fraction and relatively coarse secondary hull residues in the water medium and filtering the relatively coarse secondary hull residues from the suspension of said cellulose-rich fraction in said water.

2. The method of fractionating soybean hulls of particle size exceeding that passing a No. 60 sieve comprising steeping a composition consisting essentially of clean soybean hulls in a polar water-miscible organic liquid selected from the group consisting of methanol, ethanol, propanol-1, propanol-2, acetic acid ethylene glycol, acetone and methyl ethyl ketone at a temperature lying within the range of 0° C. to the boiling point of the liquid, whereby a finely divided protein-rich fraction of said hulls is loosened from the hull structure, agitating the steep mixture of hulls and organic liquid to obtain a mixed suspension consisting essentially of said protein-rich fraction and relatively coarse primary hull residues in the organic liquid medium, filtering the relatively coarse hull residues from the suspension of said protein-rich fraction in the organic liquid, steeping the separated hull residues in water at temperatures of 5° C.–100° C., whereby a finely divided cellulose-rich fraction of said hulls is loosened from the hull structure, agitating the steep mixture of primary hull residues and water to obtain a mixed suspension consisting essentially of said cellulose-rich fraction and relatively coarse secondary hull residues in the water medium, and decanting the suspension of said cellulose-rich fraction in water from the relatively coarse secondary hull residues.

3. The method of fractionating soybean hulls of particle size exceeding that passing a No. 60 sieve comprising steeping a composition consisting essentially of clean soybean hulls in a polar water-miscible organic liquid selected from the group consisting of methanol, ethanol, pronanol-1, propanol-2, acetic acid, ethylene glycol, acetone and methyl ethyl ketone at a temperature lying within the range of 0° C. to the boiling point of the liquid, whereby a finely divided protein-rich fraction of said hulls is loosened from the hull structure, agitating the steep mixture of hulls and organic liquid to obtain a mixed suspension consisting essentially of said protein-rich fraction and relatively coarse primary hull residues in the organic liquid medium, decanting off the suspension of said protein-rich fraction in the organic liquid from the relatively coarse hull residues, steeping the separated primary hull residues in water at temperatures of 5° C. to 100° C., whereby a finely divided cellulose-rich fraction of said hulls is loosened from the hull structure, agitating the steeped mixture of primary hull residues in water to obtain a mixed suspension consisting essentially of said cellulose-rich fraction and relatively coarse secondary hull residues in a water medium and filtering the relatively coarse hull residue from the suspension of said cellulose-rich fraction in said water.

4. The method of fractionating soybean hulls of particle size exceeding that passing a No. 60 sieve comprising steeping a composition consisting essentially of clean soybean hulls in a polar water-miscible organic liquid selected from the group consisting of methanol, ethanol, propanol-1, propanol-2, acetic acid, ethylene glycol, acetone and methyl ethyl ketone at a temperature lying within the range of 0° C. to boiling point of the liquid, whereby a finely divided protein-rich fraction of said hulls is loosened from the hull structure, agitating the steep mixture of hulls and organic liquid to obtain a mixed suspension consisting essentially of said protein-rich fraction and relatively coarse primary hull residues in the organic liquid medium, decanting off the suspension of said protein-rich fraction in the organic liquid from the primary hull residues, steeping the separated primary hull residues in water at temperature of 5° C. to 100° C., whereby a finely divided cellulose-rich fraction of said hulls is loosened from the hull structure, agitating the steep mixture of primary hull residues and water to obtain a mixed suspension consisting essentially of said cellulose-rich fraction and relatively coarse secondary hull residues in the water medium, and decanting the suspension of said cellulose-rich fraction in said water from the relatively coarse secondary hull residues.

References Cited in the file of this patent

UNITED STATES PATENTS

| | | |
|---|---|---|
| 1,314,298 | Yamamota | Aug. 26, 1919 |
| 2,320,970 | Lansing | June 1, 1943 |
| 2,444,241 | Beckel et al. | June 29, 1948 |
| 2,445,931 | Beckel et al. | July 27, 1948 |

OTHER REFERENCES

Markley text: "Soybeans and Soybean Products," Interscience Publishers, Inc., New York, vol. 1, 1950, page 373.